United States Patent [19]

Cline et al.

[11] 4,141,423
[45] Feb. 27, 1979

[54] VEHICLE SUSPENSION APPARATUS

[75] Inventors: Michael I. Cline, Morton; Arthur E. Olt, Jr., Pekin, both of Ill.

[73] Assignee: Caterpillar Tractor Co., Peoria, Ill.

[21] Appl. No.: 814,235

[22] Filed: Jul. 8, 1977

[51] Int. Cl.² .................. B62D 55/00; B60K 17/00
[52] U.S. Cl. ................................. 180/9.6; 305/60
[58] Field of Search .................. 180/9.6, 9.62, 6.2; 305/60; 308/120 B, 121

[56] References Cited
U.S. PATENT DOCUMENTS 3,800,901  4/1974  Blomstrom ..................... 180/9.62
3,907,054  9/1975  Lavish .............................. 180/9.6

*Primary Examiner*—Philip Goodman
*Attorney, Agent, or Firm*—Phillips, Moore, Weissenberger, Lempio & Majestic

[57] ABSTRACT

A vehicle suspension apparatus includes a shaft on which track frames are pivotally mounted, the shaft at the ends thereof having fitted on each end thereof a cap, the track frame on that end having secured thereto a retaining member with a plate in sealing relation with the track frame and disposed between the cap and retaining member.

10 Claims, 1 Drawing Figure

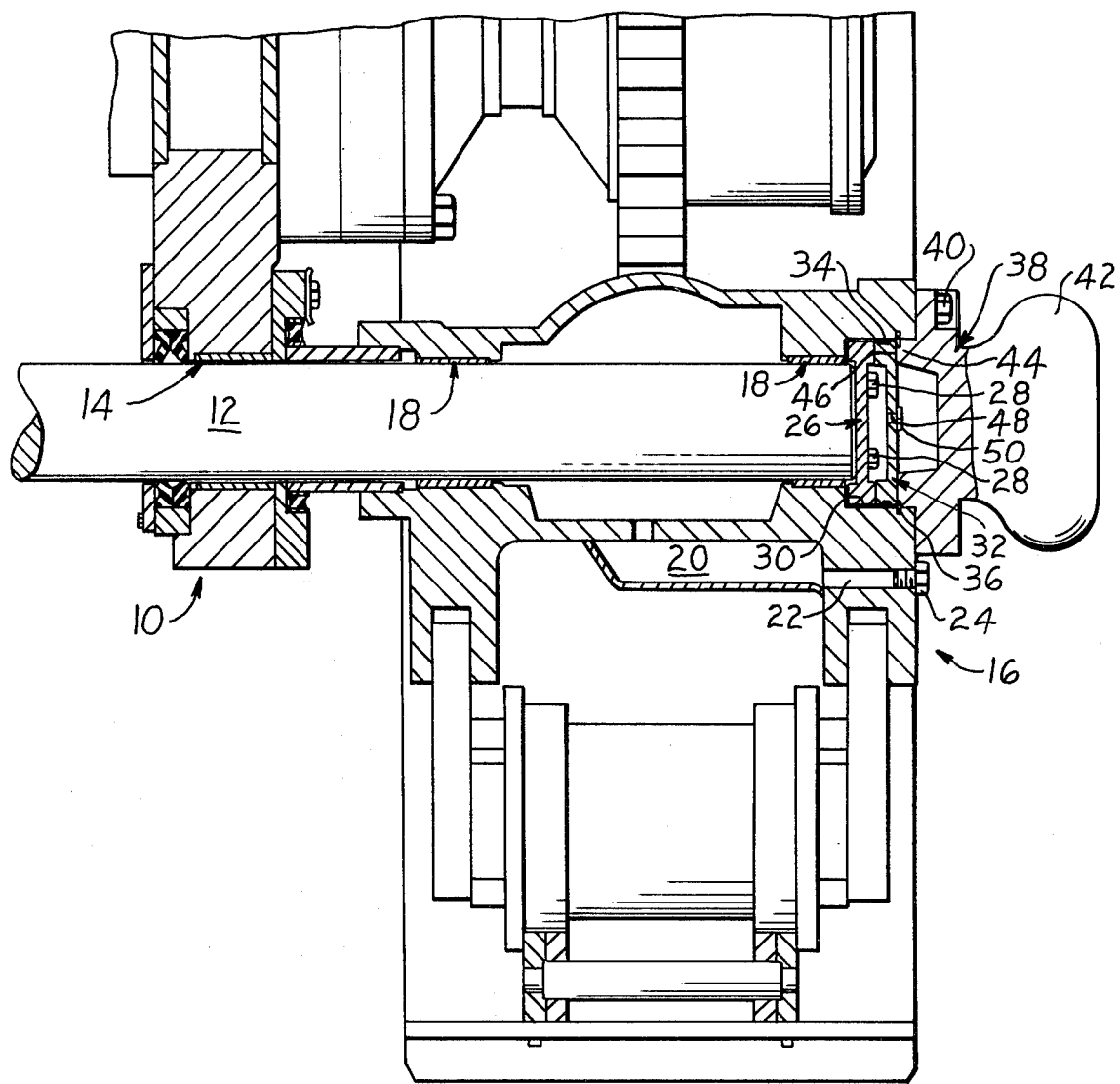

VEHICLE SUSPENSION APPARATUS

BACKGROUND OF THE INVENTION

This invention relates to vehicle suspension apparatus, and more particularly, to a suspension apparatus including track frames mounted on a shaft.

In the mounting of a track frame on a shaft of a vehicle, so that the track frame is pivotable about the axis of the shaft, it is known to provide an inner track frame chamber wherein oil is contained for lubricating purposes. In general, the shaft has fitted to an end thereof a cap, and a retaining member is bolted to the track frame, the retaining member fitting tightly to the track frame so that oil within the track frame around the shaft is retained therein.

In the shipment of a vehicle such as that described, it is advantageous to remove the retaining member from its associated track frame, whereupon the cap secured to the end of the shaft becomes exposed. In such state, oil filling the chamber of that track frame may run past the end cap from the chamber therein and be lost.

SUMMARY OF THE INVENTION

The present invention is directed to overcoming one or more of the problems as set forth above.

In accordance with the present invention, the invention is a vehicle suspension apparatus comprising shaft means, and frame means mounted on the shaft means, and defining chamber means in which oil can be contained in the proximity of the shaft means. A cap is secured to the shaft means. A retaining member is secured to the frame means. Plate means are positioned between the cap and retaining member, the retaining member, plate means and cap acting to retain the frame means on the shaft means. Seal means are operatively associated with the plate means for providing sealing relation between the plate means and frame means for retaining oil contained in the chamber means.

BRIEF DESCRIPTION OF THE DRAWINGS

Other objects of the invention will become apparent from a study of the drawing, which is a sectional view of a portion of a vehicle incorporating the present invention.

DESCRIPTION OF THE PREFERRED EMBODIMENT

Shown in FIG. 1 is a main frame 10 of a vehicle. A shaft 12 is disposed through an aperture 14 in the main frame 10, and a track frame 16 is mounted on the shaft 12 so as to be pivotable about the longitudinal axis of the shaft 12, appropriate bearings 18 being provided to allow such pivoting. The track frame 16 defines a chamber 20 in which oil is contained in the proximity of the shaft 12, the chamber 20 communicating with a drain passage 22 having a drain plug 24 therein.

A cap 26 is removably secured to an end of the shaft 12 by means of bolts 28, the cap 26 being disposed within a stepped bore 30 defined by the frame 16. Positioned within the bore 30 adjacent the cap 26 is a plate 32 defining an annular channel about the outer periphery thereof, in which is placed an annular elastomeric seal 34. The annular seal 34 is in sealing relation with the bore 30 of the frame 16. Both the cap 26 and the plate 32 can be removed freely from within the bore 30. A snap ring 36 is positionable within the bore 30 in the frame 16 to retain the plate 32 in the position shown.

A retaining member 38 is removably secured to the frame 16 by means of bolts 40. The retaining member 38 has a trunnion mount 42 thereon and includes an annular projecting portion 44 sized to fit within the bore 30 and having an extended surface 46 in close proximity to the plate 32. Thus, the plate is positioned between the cap 26 and retaining member 38, and the retaining member 38, plate 32 and cap 26 act to retain the frame 16 on the shaft 12.

The plate 32 defines a threaded bore 48 therethrough in which is disposed a removable threaded bolt 50.

It will be seen that with the parts positioned as thus far described, with a lateral, rightward load on the shaft 12 generally along the longitudinal axis thereof, i.e., directed toward the retaining member 38, the cap 26 is in contact with the plate 32 which is in turn in contact with the retaining member 38. Thus, high lateral loads placed on the shaft 12 are taken by the retaining member 38 during normal operation of the vehicle. During such normal operation, it will be understood that chamber 20 is substantially filled with oil.

Upon removal of the retaining member 38 for purposes of shipping the vehicle, the snap ring 36 retains the plate 32 in place, and the seal 34 continues to provide sealing relation between the plate 32 and the frame 16, so that oil is retained in the chamber 20. With the vehicle in such state, it will be noted that the vehicle can be moved for purposes of shipping thereof.

It will be seen that in such state, the plate 32 is retained in place relative to the frame by the snap ring.

If it is desired that the plate 32 be removed subsequent to removal of the retaining member 38, oil may be drained from the chamber 20 by removal of the drain plug 24. The bolt 50 may then be removed from the plate 32, so that the plate 32 defines passage means 48 therethrough. The passage means 48 allow air to flow from the outside of the plate 32 to the inside thereof in the area of the cap 26, so as to allow relatively easy removal of the plate 32 from within the bore 30. Such removal would be rather more difficult without such passage means 48 being provided, since air would by necessity have to flow past the annular seal 34 upon withdrawal of the plate 32. Also, to aid in removal of the plate 32, a long threaded bolt (not shown) may be threadably disposed through the bore 48, and brought into contact with the cap 26, whereupon further rotation of the long bolt will draw the plate 32 away from the cap 26 and from the bore 30 defined by the frame 16.

The embodiments of the invention in which an exclusive privilege or property is claimed are defined as follows:

1. Vehicle suspension apparatus comprising:
    shaft means;
    frame means mounted on the shaft means, and defining chamber means in which oil may be contained in the proximity of the shaft means;
    a cap secured to the shaft means;
    a retaining member secured to the frame means;
    plate means positioned between the cap and retaining member, the retaining member, plate means and cap acting to retain the frame means on the shaft means; and
    seal means operatively associated with the plate means for providing sealing relation between the plate means and frame means, for retaining oil contained in the chamber means.

2. The apparatus of claim 1 wherein the retaining member is removably secured to the frame means.

3. The apparatus of claim 2 wherein the plate means are removable from the frame means.

4. The apparatus of claim 1 wherein, upon lateral load on the shaft means directed toward the retaining member, the cap is in contact with the plate means, in turn in contact with the retaining member.

5. The apparatus of claim 2 and further comprising means for selectively retaining the plate means in place relative to the frame means upon removal of the retaining member.

6. The apparatus of claim 5 wherein the means for selectively retaining the plate means comprise snap ring means.

7. The apparatus of claim 1 and further comprising means for selectively providing passage means through the plate means.

8. The apparatus of claim 7 wherein the means for selectively providing passage means through the plate means comprise removable bolt means threadably engaged with a threaded bore defined by the plate means.

9. The apparatus of claim 3 and further comprising means for selectively providing passage means through the plate means.

10. The apparatus of claim 9 wherein the means for selectively providing passage means through the plate means comprise removable bolt means threadably engaged with a threaded bore defined by the plate means.

* * * * *